Feb. 16, 1960 — R. A. HACKLEY ET AL — 2,925,581
SCANNING SYSTEMS
Filed Aug. 30, 1950 — 2 Sheets-Sheet 1
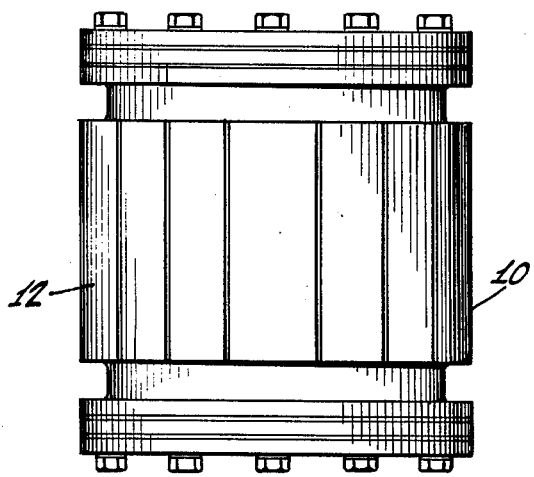
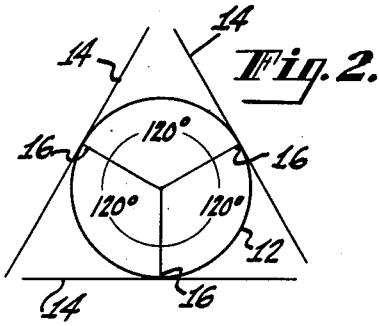
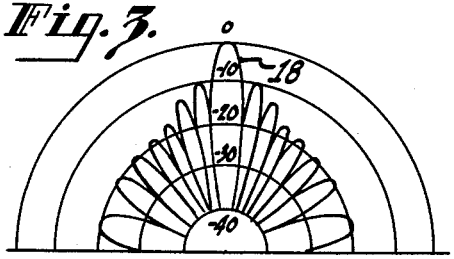
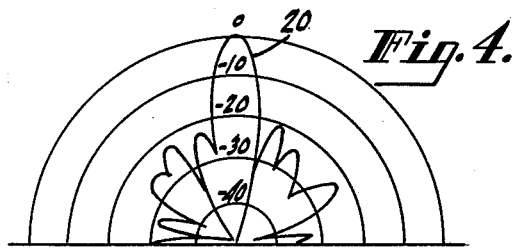
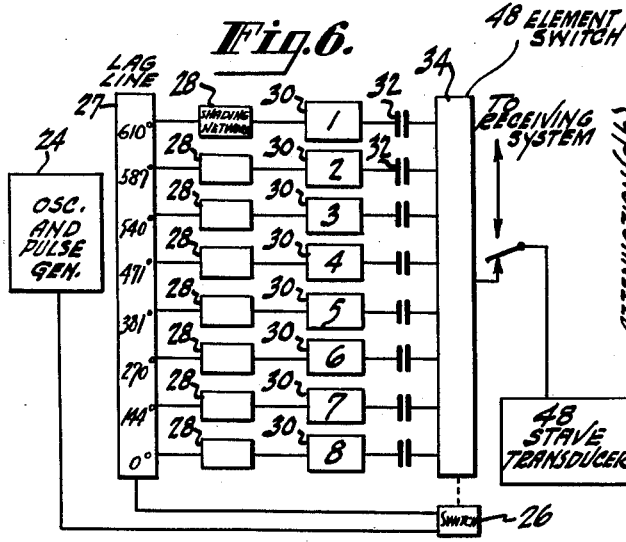
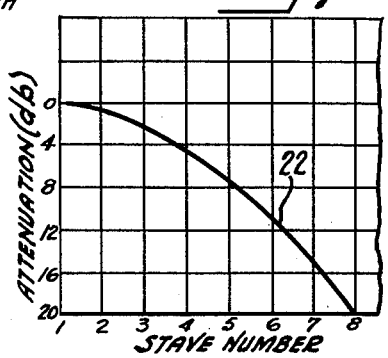
INVENTORS
REGINALD A. HACKLEY &
EDWARD S. ROGERS
BY
ATTORNEY

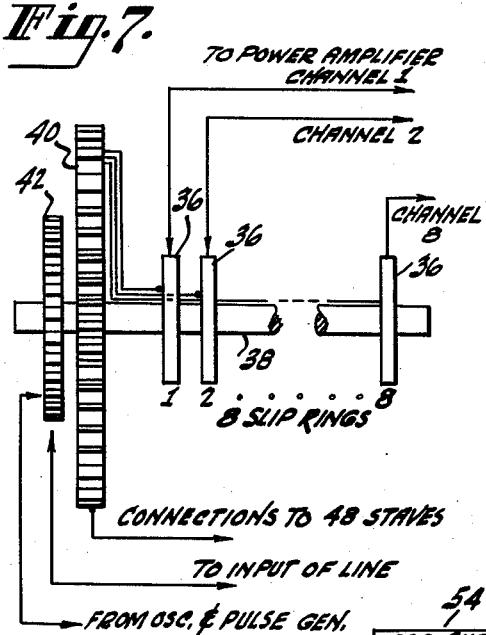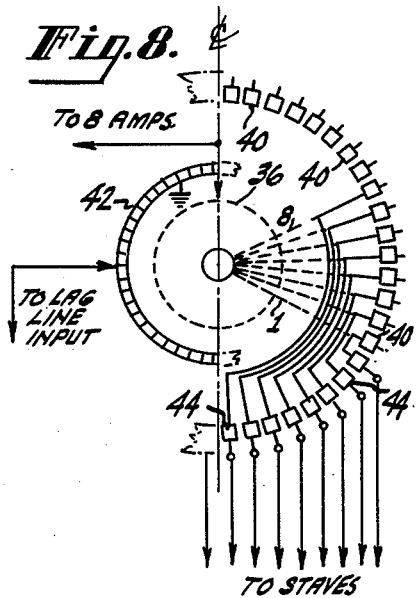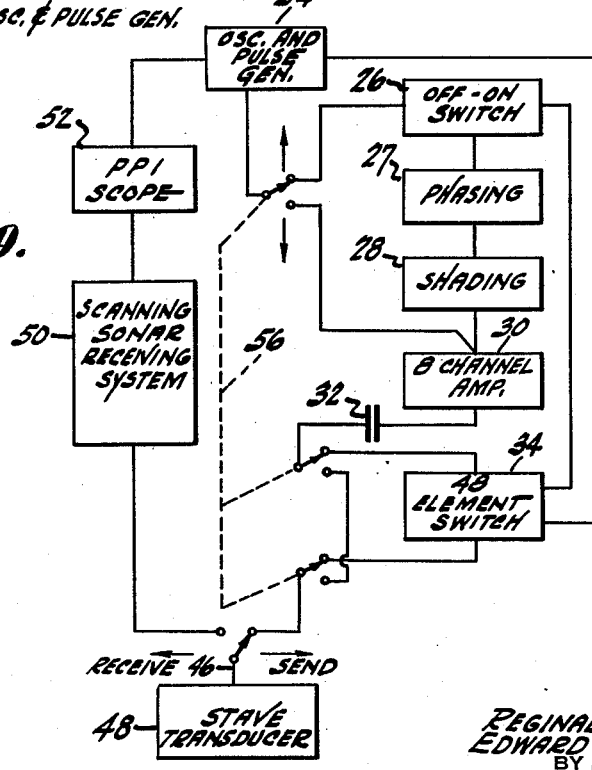

United States Patent Office 2,925,581
Patented Feb. 16, 1960

2,925,581

SCANNING SYSTEMS

Reginald A. Hackley, Princeton, and Edward S. Rogers, Trenton, N.J., assignors, by mesne assignments, to the United States of America as represented by the Secretary of the Navy Application August 30, 1950, Serial No. 182,281

4 Claims. (Cl. 340—6)

This invention relates to ultrasonic detecting and ranging systems and more particularly is an improvement in the scanning on transmission of such systems which have non-directional transducers.

In view of the high speeds at which modern vessels travel, it is both necessary and desirable to increase the range of ultrasonic detecting and ranging systems, commonly known as sonar, in order to provide a sufficient warning time of the nearness of other vessels, shoals, rocks or the like. In the past, range has been increased by increasing the gain of the receiving amplifier or by increasing the power radiated into the water. However, the amount of useful gain a receiving system can have is limited by the noise level. Usually the ambient noise in the water is the controlling factor, but under very quiet water conditions the ultimate gain available is limited by the inherent thermal noise of the components of the amplifier and transducer. Furthermore, the total amount of power which can be radiated by a given size transducer, at a given pulse length, is limited by cavitation in the water at the surface of the transducer. In present sonar systems, having non-directional transducers, the gain of the receiving amplifier has been increased to the point where it is limited by thermal noise, and the radiated power output is very close to the power level which will produce cavitation. It therefore appears that further attempts to increase the sonar range by increasing the gain or the power input to the same size transducer appears futile.

It may readily be shown that the range of a sonar system does not depend on the total power radiated into the water, but rather upon the distribution of the sound energy in the water, i.e., upon the sound intensity.

It is therefore an object of the present invention to provide an increase in the range of ultrasonic detecting and ranging systems having a non-directional scanning transducer.

Another object of the present invention is to provide an increase in the range of ultrasonic detecting and ranging systems having a non-directional scanning transducer without increasing the size of, or power input to, the transducer.

A further object of the present invention is to provide an increase in the intensity of the sound energy radiated into water by a non-directional scanning transducer without increasing the size or power input to the transducer.

It is still a further object of the present invention to provide an improved system for scanning on transmission of an ultrasonic detection and ranging system having a non-directional scanning transducer.

These and further objects of the present invention are achieved by exciting a non-directional transducer so that, instead of transmitting a pulse of sound energy, as is the present practice, which has a non-directional pattern in the horizontal plane and which floods the area surrounding the projector with sound, the non-directional transducer is excited so that its entire output is substantially converted into directional beams of sound energy, of higher intensity than the non-directional sound energy, and the beams are then slowly rotated in order to flood the surrounding area with the sound energy. In other words, a non-directional transducer, consisting of a plurality of active faces or staves arranged on the surface of a cylinder, has energy applied to the staves in such phase that three directional beams are formed. The phase of the excitation of the staves is then transferred between the staves so that the three directional beams are rotated around the transducer.

The novel features of the invention as well as the invention itself, both as to its organization and method of operation, will best be understood from the following description when read in connection with the accompany drawings, in which Figure 1 represents a typical non-directional sonar transducer, Figure 2 is a top view of the transducer, represented as a circle, having three tangent planes thereto at 120-degree points, Figure 3 is a curve of the directional pattern of a 120-degree sector (of a 19-inch diameter scanning sonar transducer) including 16 staves, which is excited with straight-line phasing, Figure 4 is a curve of the directional pattern of a 120-degree sector (of a 19-inch diameter scanning sonar transducer) including 16 staves, which is excited with straight-line phase, and whereon shading is used, Figure 5 is a curve of the shading loss which is used to obtain the curve of Figure 4, Figure 6 is a schematic diagram of a system for generating energy of the proper phase for the directional excitation of a non-directional transducer, Figure 7 is a view, partially in section, of a commutation system used to couple the properly phased energy to the staves of the non-directional transducer, Figure 8 is an end view partially in section, of the system shown in Figure 7, and Figure 9 is a schematic diagram of a sonar system which includes beamed and non-directional transmission.

Referring now to Figure 1, there is shown a drawing exemplifying a typical non-directional transducer 10 having a plurality of staves 12 or active faces mounted on the outside of a cylindrical surface to provide a cylindrical radiating surface. Each stave 12 may include one or more active elements which may be of a piezo-electric or magnetostrictive material. The center of the transducer is water-tight and the wiring from each stave is brought through the center of the transducer and thence connected to the remaining apparatus of the sonar system. It is customary, in the operation of the sonar system, having a non-directional transducer, to excite all the staves simultaneously, so that a pulse of sound which has a directional pattern in the vertical plane and a non-directional pattern in the horizontal plane is radiated into the area surrounding the transducer. On reception the same transducer is made directional in the horizontal plane and its directivity pattern is rapidly rotated.

By properly phasing the energy applied to a group of staves which may be said to be opposed to an imaginary plane tangent to the transducer, the emitted sound energy may be made directional. Figure 2 shows a top view of the transducer 12, represented by a circle, with three planes 14 tangent thereto at 120 degree points. Three directive beams of sound energy are obtainable by exciting the staves in each one-third of the transducer opposite a plane. The determination of the phase of the excitation applied to a stave is made on the basis of the reciprocal of the time required for the energy to travel from the stave to the plane. Therefore, considering as zero reference phase the energy applied to the staves farthest from and yet still presented to a plane (one stave is on either side of the line of tangency made by the plane and the transducer), the energy applied to the staves closest to the plane (the stave at or the two staves on either side of the line of tangency made by the plane and the transducer) has its phase delayed a maximum. The staves in between these two outside and two center staves receive energy whose phase is delayed inversely to the time of travel of that energy between the stave and the plane. In this manner the energy radiated from the staves in each one-third of the transducer reaches the opposed tangent plane 14 substantially simultaneously and thus the transducer output is directional, or beamed. The sharpness of the beam depends upon the diameter of the transducer and the frequency at which it operates.

Figure 3 shows a directivity pattern 18 which was obtained by the proper phasing of 16 staves of a 48-stave transducer, at a frequency of 26 kc. The transducer had a diameter of 19 inches. It may be seen from the pattern that side lobes are present which are approximately 12½ decibels below the main lobe. By shading or reducing the power applied to the outer staves used to form the beam, the side lobes can be reduced. Referring to the pattern shown in Figure 4 a transmitting pattern 20 is seen which is obtainable using the shading loss curve 22 shown in Figure 5. This type of shading reduces the power in such a way that the level applied to the two outermost staves is 20 db below the power applied to the center staves. The radiated beam is thus made sharper with shading.

It will be appreciated that, by converting the total energy output of a non-directional transducer into three directional beams which contain all the energy radiated, the sound pressure in the transmitting medium is greater at points which are distant from the transducer than when the total energy output of the transducer is radiated into the transmitting medium omni-directionally. For equal powers into a projector the gain in peak pressure, for the pattern without shading shown in Figure 3, over a non-directional pattern has been calculated as 11.25 db or the equivalent of an increase in power of 13.35 times. This permits an increase of range of from 21% to 40% depending upon water conditions and frequency of transmission used. When shading of the beam is used, the pattern for which is shown in Figure 4, for the same power input to the unshaded staves as for all the staves in the non-directional case a gain of 6.88 db is realized. Since there is no obvious advantage for side lobe reduction during transmission, the preferred embodiment of this invention is one which does not employ shading during transmission.

Referring now to Figure 6, there is shown a schematic diagram of a transmitting system for directional beam transmission. This diagram shows a transmitting system for use with a 19-inch diameter, 48-stave transducer using three directional beams. This is not to be construed as a limitation, since, from the principles applicable herein which will become more clear as the system is described, further modifications or alterations of the system required to drive other sizes of transducers having other numbers of staves to provide beamed transmission will become apparent. Signal and pulse generation are accomplished in the manner well known to the art by an oscillator and pulse generator 24. The output from the oscillator and pulse generator is fed through an off-on switch 26 to a lag-line 27 or phase delaying network where eight voltages of the proper phase are made available to transform each of eight pairs of staves, which are included in a 120-degree section of the transducer into a straight line energy radiating source.

Each of these eight voltages is applied through a shading network 28, if shading is desired, to the input of an amplifier 30 having sufficient gain and power output capacity to supply one-eighth of the total power required to drive the complete projector. The outputs of these eight amplifiers are fed through a tuning capacitor 32 to a 48-element switch 34. Each element of the switch is connected through a send-receive relay to one stave of the 48-stave transducer. As indicated previously the required phases of the voltages are computed based on the time required for a signal to travel from a tangent plane to a stave presented to that plane. The staves are then excited in inverse phase so that the stave closest to the plane receives the voltage which has the largest phase delay and the stave farthest from the plane receives voltage which has the least phase delay. The number of phase delayed voltages required are half the number of staves presented to a tangent plane for the sector which it is desired to energize as a beam source.

Referring now to Figure 7 there is shown, partially in section, a commutation and off-on switching system which is the 48-element switch 34 represented by a rectangle in Figure 6. The output from each of the eight amplifiers 30 in each of the eight channels is applied through its respective tuning capacitor 32 by means of an individual brush to a slip ring 36 mounted on a shaft 38. Also mounted on the shaft, 38, to revolve therewith, are 48 commutator segments 40 and a rotary off-on switch 42 which was represented by a rectangle 26 in Figure 6. Rotary off-on switches are well known in the art. Each of the slip rings 36 is connected to six commutator segments 40, two in each 120-degree sector. Figure 8 shows an end view in section of Figure 7. Each of the staves is connected to a stationary brush 44 by means of which contact is made with the commutator segments 40. The off-on switch 42 is arranged to cut off the power applied to the lag-line 27 when the brushes are between commutator segments and to re-apply the power while the brushes are each on a single commutator segment.

Figure 8 also shows the manner of connecting the eight slip rings 36 to 16 commutator segments 40 which are connected through 16 brushes 44 to 16 staves in a 120-degree sector of a transducer. The two center commutator segments are connected to the slip ring which carries the voltage having the maximum phase delay (channel 1). The two outermost commutator segments are connected to the slip ring which carries the voltage having zero or minimum phase delay (channel 8). The other slip rings are connected to pairs of commutator segments, one on either side of the center pair to provide, for the staves connected thereto, a voltage having a gradually increasing phase delay. As previously indicated, each one-third or 120-degree sector of the commutator is similarly connected to the slip rings so that each one-third of the transducer is excited to provide three beams of sound energy.

The shaft upon which the slip rings, commutator and off-on switch are mounted may be driven by a motor 38 (not shown). This has the effect of transferring the phase delay voltages to each of the staves in turn causing the three-directional beams to rotate about the projector with their axes separated by 120 degrees. Thus, when the commutator is rotated through 120 degrees, sound is projected through 360 degrees.

Due to the time interval necessary to scan the three 120-degree sectors during transmission, the echoes are received from targets having the same range but different bearings at different times. This means that it is necessary to modify the deflection circuits of indicating oscilloscope tubes in order to indicate correct ranges at all bearings. The required time interval also precludes the use of the transmission scanning system for very short ranges since, an echo from a short range object, which occurs near the start of the scanning pulse, is returned before the completion of the transmission cycle. Therefore a sonar system using beamed transmission for long ranges should also include provisions for non-directional transmission for short ranges.

Referring now to Figure 9, there may be seen a block diagram of a complete sonar system. Upon completion of a transmission cycle, whether directional or non-directional, a send-receive relay 46 is switched from the transmit to the receive position and the transducer 48 is connected to the usual scanning sonar receiving system 50 including an indicating oscilloscope 52 which receives a synchronizing signal from an oscillator and pulse generator 54. A switch 56 is provided whereby the phasing and commutating portions of the directional transmitting system are by-passed and signals from the oscillator and pulse generator 54 are applied to the eight channel amplifiers 30 and from the amplifiers to the transducer 48. In this event, operation of the transducer for transmitting and receiving is conventional.

For directional transmission, the switch 56 is thrown to the directional projection position and operation of the system is as previously described. It is of interest to determine the minimum range at which the directional scanning system can operate for a typical cycle. With a receiving scanning speed of 7200 r.p.m., a cycle of 9 milliseconds for transmission and one millisecond for switching for each of the sixteen staves comprising a 120-degree sector of the transducer a total of 160 milliseconds are required for the transmission cycle. This means that the front of the pulse, transmitted at zero degrees bearing, will have traveled a total of 264 yards or a range of 132 yards before the completion of the final pulse at a bearing of 120 degrees. This sets the minimum range at which the scanning system having the above indicated operational cycle can operate as something greater than 132 yards, depending upon the time required for the receiving system to start functioning. For this operating cycle the speed of the 48-element commutator and the on-off rotary switch is 125 r.p.m.

From the foregoing description it will be readily apparent that a novel transmitting system has been provided for a sound navigation and ranging system having a non-directional transducer wherein the range of the system is increased without any increase in power applied or without any incrase in the size of the transducer. Although but a single embodiment of the present invention has been shown and described, it should be apparent that many changes may be made in the particular embodiment herein disclosed, and that many other embodiments are possible, all within the spirit and scope of the invention. Therefore, it is desired that the foregoing description shall be taken as illustrative and not as limiting.

What is claimed is:

1. In an ultrasonic detection and ranging system having a transducer consisting of a plurality of active elements arranged in the form of a cylinder, a system for increasing the scanning range of said ultrasonic detection and ranging system comprising means to excite each active element with eneregy having a phase delay inversely proportional to the time of travel of said energy from said active element to one of three tangent planes to which said element is presented, said three planes being tangent at lines spaced 120 degrees around said transducer, and means to transfer the phase of excitation of each active element to an adjacent active element to provide rotation of said three beams of energy around said transducer.

2. In an ultrasonic detection and ranging system having a transducer consisting of a plurality of staves arranged in the form of a cylinder, a system for increasing the scanning range of said ultrasonic detection and ranging system comprising a delay line, means to impress energy at one end of said delay line, a plurality of energy tap-off points along said delay line, the number of said points being determined by one-sixth the total number of staves in said transducer, the positioning of each of said points progressively along said delay line being determined by the time required for said energy to travel to a plane tangent to said transducer from each of the staves presented to said plane on one side of the tangent line made by said plane, a plurality of fixed brushes each connected to a stave of said transducer, a commutator having a plurality of commutator segments in contact with and equal in number to said brushes, means to couple each of said delay line tap-off points to a different pair of commutator segments included in each one-third sector of said commutator, the delay line tap-off points being connected to the commutator segments in each one-third sector of the commutator so that the two outermost segments in each sector receive the least delayed energy, the center commutator segments in each one-third sector receive the most delayed energy and the delay of the energy applied to the intervening segments progressively changes therebetween, means to rotate said commutator, and switch means to innterrupt the application of energy to said delay line when said commutator segments are between said brushes.

3. In an ultrasonic detecting and ranging system having a transducer consisting of a plurality of staves arranged in the form of a cylinder, a system for increasing the scanning range of said detecting and ranging system comprising a delay line, means to impress energy at one end of said delay line, a plurality of energy tap-off points along said delay line, the number of said points being determined by one-sixth the total number of staves in said transducer, the positioning of each of said points progressively along said delay line being determined by the time required for said energy to travel to a plane tangent to said transducer from each of the staves presented to said plane on one side of the tangent line made by said plane, means to couple each of said energy tapping points to staves presented to said plane and equally positioned on either side of said line of tangency to excite said staves to provide an output from said transducer having substantially a plane wavefront, said last named means including attenuation means to gradually attenuate the energy applied to said staves from a minimum attenuation for the greatest phase delayed energy to a maximum attenuation for the least phase delayed energy whereby the output from said transducer is sharpened, and means to progressively transfer said coupling means to all of the staves in said transducer to provide a rotation of said plane wavefront output.

4. In a sonar system having a transducer consisting of a plurality of staves arranged in the form of a cylinder, a system for increasing the scanning range of said system comprising a delay line, means to impress energy at one end of said delay line, a plurality of energy tap-off points along said delay line, the number of said points being determined by one-sixth the total number of staves in said transducer, the positioning of each of said points progressively along said delay line being determined by the time required for said energy to travel to a plane tangent to said transducer from each of the staves presented to said plane at one side of the tangent line made by said plane, means to couple each of said energy tapping points in parallel to staves presented to two other planes, each of said two other planes being tangent to said transducer at lines 120 degrees on either side of said line of tangency to provide three 120 degree spaced substantially plane wave energy outputs from said transducer, said last named means including attenuation means to gradually attenuate the energy applied to said staves from a minimum attenuation for the greatest phase delayed energy to a maximum attenuation for the least phase delayed energy whereby the output from said transducer is sharpened, and means to progressively transfer said coupling means to all of the staves in said transducer to provide a rotation of said energy outputs about said transducer.

References Cited in the file of this patent
UNITED STATES PATENTS

| | | |
|---|---|---|
| 1,636,510 | Hayes et al. | July 19, 1927 |
| 2,407,242 | Batchelder | Sept. 10, 1946 |
| 2,411,910 | Turner | Dec. 3, 1946 |